United States Patent
Wang et al.

(10) Patent No.: US 6,707,979 B2
(45) Date of Patent: Mar. 16, 2004

(54) OPTICAL LOOP-BACK ATTENUATOR

(75) Inventors: Chung-Chih Wang, Tu-Chen (TW); Yao-Hao Chang, Tu-Chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/035,551

(22) Filed: Dec. 27, 2001

(65) Prior Publication Data
US 2003/0123838 A1 Jul. 3, 2003

(30) Foreign Application Priority Data
Oct. 31, 2001 (CN) ........................................ 90218616 U

(51) Int. Cl.[7] ................................................. G02B 6/00
(52) U.S. Cl. ........................................................ 385/140
(58) Field of Search ............................................. 385/140

(56) References Cited

U.S. PATENT DOCUMENTS

| | | | | |
|---|---|---|---|---|
| 4,979,793 A | * | 12/1990 | Bowen et al. | 385/140 |
| 5,259,045 A | * | 11/1993 | Azuma et al. | 385/4 |
| 5,311,614 A | * | 5/1994 | Caron et al. | 385/140 |
| 5,475,781 A | * | 12/1995 | Chang et al. | 385/76 |
| 5,677,977 A | * | 10/1997 | Smith | 385/140 |
| 6,454,464 B1 | * | 9/2002 | Nolan | 385/60 |

* cited by examiner

Primary Examiner—Hemang Sanghavi
Assistant Examiner—Scott A Knauss
(74) Attorney, Agent, or Firm—Wei Te Chung

(57) ABSTRACT

An optical loop-back attenuator (2) includes a frame (22), a cover (21) attached to the frame, an optical fiber (24), an optical fiber fixture (23) retaining and fixing the optical fiber, and two SC plug connectors (25) receiving and retaining opposite ends of the optical fiber therein. The frame and the cover cooperate to fittingly receive the optical fiber, the optical fiber fixture and portions of the SC plug connectors therein. The optical fiber has a bent part (242) which is configured to be semicircular or to have another suitable shape that achieves a desired attenuation.

11 Claims, 5 Drawing Sheets

OPTICAL LOOP-BACK ATTENUATOR

BACKGROUND OF THE INVENTION

1. Field of the Invention

The present invention relates to optical attenuators, and particularly to a loop-back attenuator used for testing optical equipment either prior to installation or after installation.

2. Description of Prior Art

Optical fibers are utilized to transmit optical signals among various items of optical equipment in optical communications systems. Testing of the items of optical equipment is necessary to assure proper functioning. In testing, test conditions must accurately simulate the anticipated operating environment. In operation, optical communications systems generally experience unavoidable attenuation in the optical fibers. That is, loss of optical power transmitted through the fibers. Such systems are specified in terms of maximum optical attenuation that can occur between transmitting and receiving devices while still providing information transfer with substantially no error. Typically, an emitter and a detector of an item of optical equipment to be tested are connected to a device that simulates the optical system that the item of optical equipment is intended to be installed in. The device simulates the system's characteristic attenuation, among other things.

Loop-back attenuators are used to provide a communication signal path that forms a loop from the emitter to the detector of the same item of optical equipment. Optical signals transmitted from the item under test are looped back to that same item and internally transmitted among its component parts. Consequently, communication from a transmitter to a receiver within the item of equipment can be accomplished without operation of other items of equipment. The loop-back attenuators simulate a loss of signal intensity expected of a communications system in which the item is to be installed for "on-line" operation.

Referring to FIGS. 1 and 2, a loop-back attenuator 1 disclosed in U.S. Pat. No. 4,952,798 comprises an upper cover 11, a lower cover 12, a screw nut 13, an optical fiber 14 and two optical fiber connectors 15. Each optical fiber connector 15 comprises a ferrule 151 for retaining a distal portion of the optical fiber 14. The optical fiber 14 is formed as a loop, and a film 152 is formed on an end surface of the optical fiber 14. The loop and the film 152 provide controlled attenuation of optical power. The upper and lower covers 11, 12 cooperate to define a space for accommodating and securing the optical fiber 14 and the optical connectors 15 therein. The upper and lower covers 11, 12 are attached to each other and fastened by the screw nut 13. Unfortunately, the film 152 needed for attenuation increases costs. Furthermore, manufacturing of the attenuator 1 is unduly time-consuming. U.S. Pat. No. 5,475,781 also discloses the attenuator.

SUMMARY OF THE INVENTION

In view of the above, an object of the present invention is to provide a loop-back attenuator having a bent optical fiber which provides desired attenuation.

In order to achieve the object set above, an optical loop-back attenuator in accordance with the present invention comprises a frame, a cover attached to the frame, an optical fiber, an optical fiber fixture retaining and fixing the optical fiber, and two subscriber connector (SC) plug connectors receiving and retaining opposite ends of the optical fiber therein. The frame and the cover cooperate to fittingly receive the optical fiber, the optical fiber fixture and portions of the SC plug connectors therein. The optical fiber has a bent part which is configured to be semicircular or to have another suitable shape that achieves a desired attenuation.

Other objects, advantages and novel features of the invention will become more apparent from the following detailed description when taken in conjunction with the accompanying drawings, in which:

DETAILED DESCRIPTION OF PREFERRED EMBODIMENTS OF THE INVENTION

Figure 1:
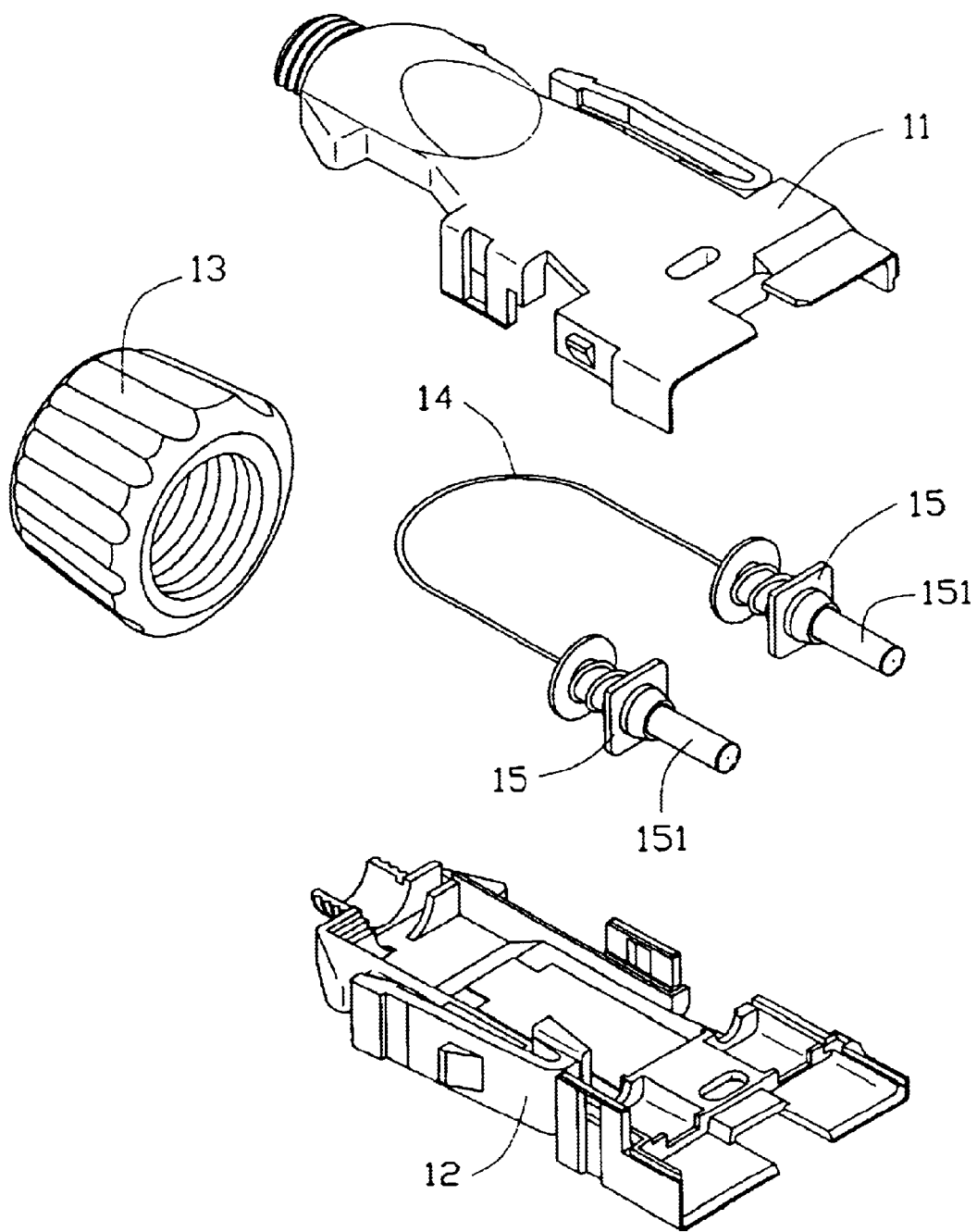
FIG. 1 is an exploded perspective view of a conventional loop-back attenuator.
Figure 2:
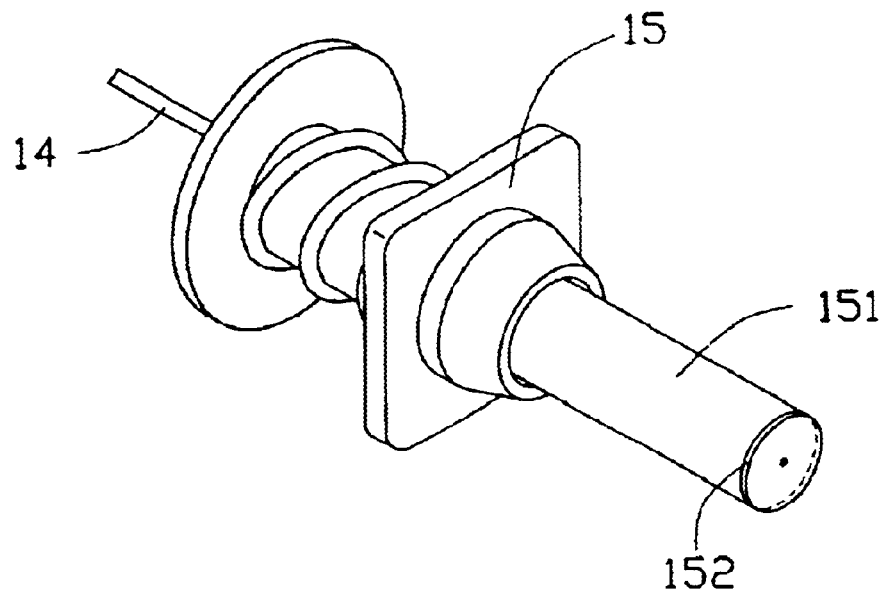
FIG. 2 is a perspective view of an optical fiber holder of the attenuator of FIG. 1.
Figure 3:
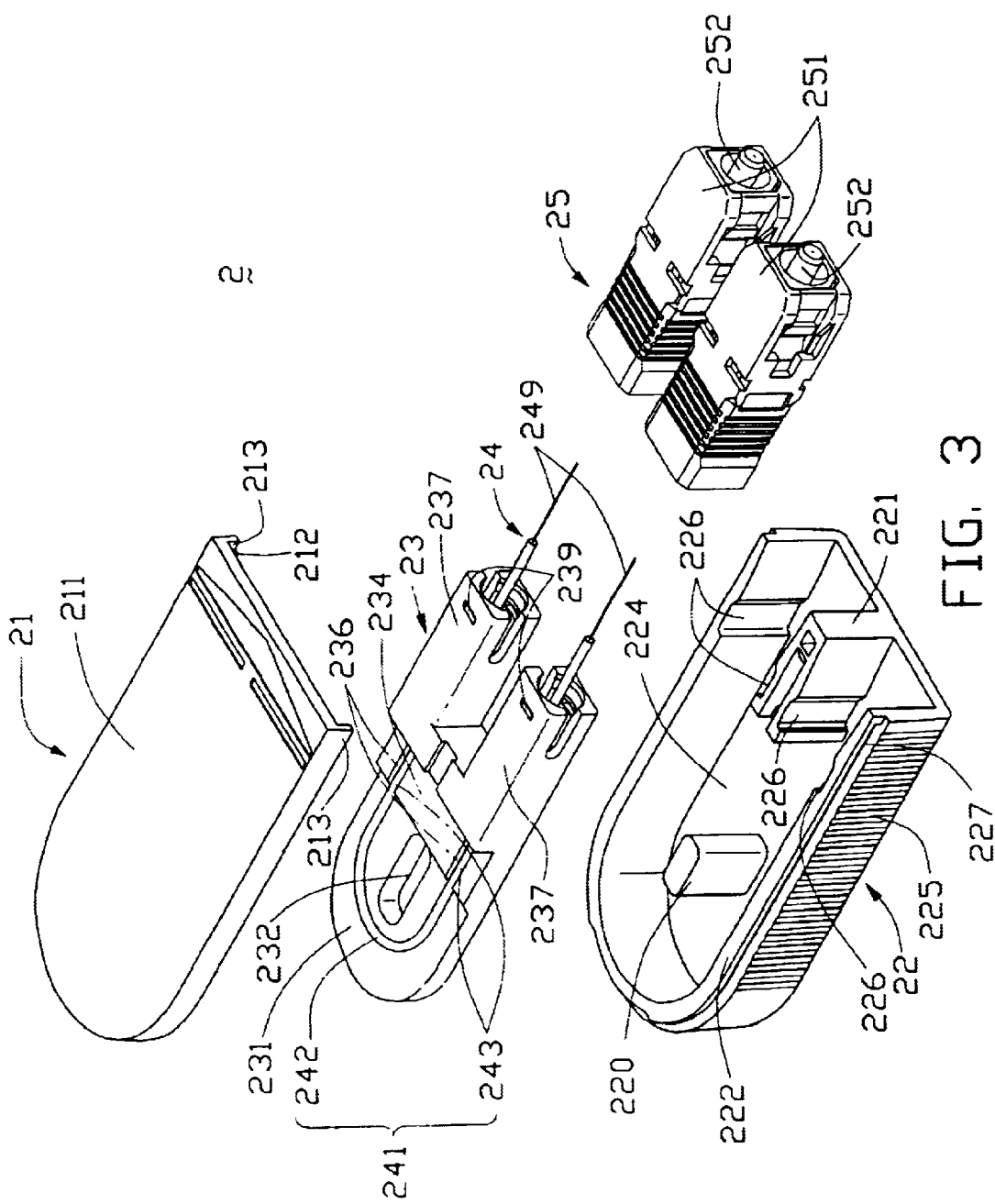
FIG. 3 is an exploded perspective view of an optical loop-back attenuator in accordance with the present invention, viewed from a bottom aspect.
Figure 4:
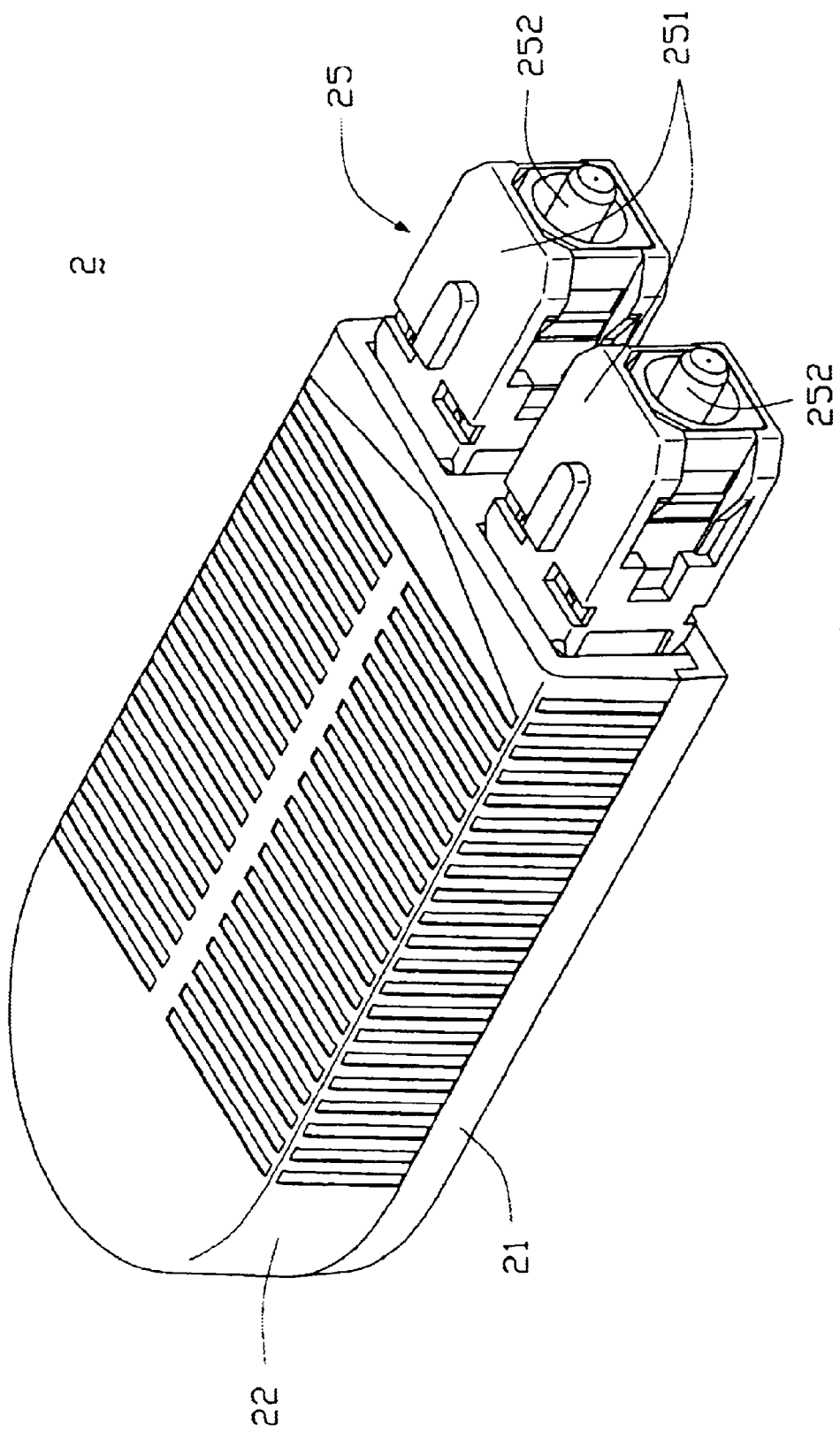
FIG. 4 is an assembled view of the attenuator of FIG. 3, but viewed from a top aspect.

Referring to FIGS. 3 and 4, an optical loop-back attenuator 2 in accordance with a preferred embodiment of the present invention comprises a frame 22, a cover 21, an optical fiber 24, an optical fiber fixture 23 retaining and fixing the optical fiber 24 thereto, and two SC plug connectors 25 receiving and retaining opposite ends of the optical fiber 24 therein.

The optical fiber 24 comprises a main cladded portion 241, and two bare portions 249 at opposite ends of the cladded portion 241 respectively. The cladded portion 241 comprises a central semicircular bent part 242, and two retaining parts 243 at opposite ends of the bent part 242 respectively. Optical power in the optical fiber 24 is attenuated by radiation loss that occurs at the bent part 242 of the optical fiber 24, according to a predetermined radius of curvature of the bent part 242. Optical power in the optical fiber 24 decreases exponentially according to a distance defined between an input position and an output position, the distance being generally designated as z. Thus, a ratio of input power to output power of an optical signal in the optical fiber 24 is given by:

$$\frac{P_{out}}{P_{in}} = e^{-\alpha_{bends} z}$$

wherein $P_{out}$ represents output power in the optical fiber 24;

$P_{in}$ represents input power in the optical fiber 24;

$\alpha_{bends}$ represents an attenuation coefficient, which is given by:

$$\alpha_{bends} = c_1 e^{-c_2 r}$$

wherein r represents a radius of curvature of the bent part 242 of the optical fiber 24; and $c_1$, $c_2$ are constants.

Accordingly, a desired attenuation can be obtained by selecting a suitable radius of curvature of the bent part 242 of the optical fiber 24. Generally, when the radius of curvature of the bent part 242 is below approximately 1 cm, macro-bend optical power losses become significant. In other embodiments in accordance with the present invention, the bent part 242 of the optical fiber 24 can be configured to be generally coiled or to have another suitable shape that achieves a desired attenuation.

The optical fiber fixture 23 comprises a rear supporting portion 231, a central retaining portion 234, and two front optical fiber holders 237. Each optical fiber holder 237 defines a through hole (not labeled) along its central axis, for extension of the optical fiber 24 therethrough. Two parallel grooves 236 are defined in the retaining portion 234 respectively in communication with the through holes of the optical fiber holders 237, for respectively retaining the retaining parts 243 of the optical fiber 24. An engaging slot 239 is defined in a bottom surface of each optical fiber holder 237, for snappingly engaging with a corresponding block (not shown) formed on an inner surface of each SC plug connector 25. A positioning hole 232 is defined in the supporting portion 231 of the optical fiber fixture 23, for engagement with the frame 22.

The frame 22 comprises a top plate 224, a U-shaped wall 225 depending from the top plate 224, a positioning post 220, a divider 221, and a rim 222. The positioning post 220 depends from a rear middle portion of the top plate 224, and corresponds to the positioning hole 232 of the optical fiber fixture 23. The divider 221 depends from a front middle portion of the top plate 224. The rim 222 is formed on a lower portion of the wall 225. An engaging groove 227 is defined in the rim 222 adjacent the lower portion of the wall 225, for engagement with the cover 21. A pair of recesses 226 is respectively defined in an inner surface of the U-shaped wall 225 near one end of the U-shaped wall, and in an opposing surface of the divider 221. Another pair of recesses 226 is respectively defined in an inner surface of the U-shaped wall 225 near an opposite end of the U-shaped wall 225, and in an opposing surface of the divider 221. Each pair of recesses 226 is for engagingly receiving a corresponding SC plug connector 25.

The cover 21 comprises a bottom plate 211, and a U-shaped flange 213 extending upwardly from the bottom plate 211. An engaging rib 212 is formed on an inner surface of the U-shaped flange 213 of the cover 21, for engaging in the groove 227 of the frame 22. Each SC plug connector 25 comprises a housing 251 and a ferrule 252 retained therein. The ferrule 252 is for retaining a corresponding bare portion 249 of the optical fiber 24. A rear portion of each SC plug connector 25 is shaped to fittingly engage in a corresponding pair of recesses 226 of the frame 22.

Figure 5:
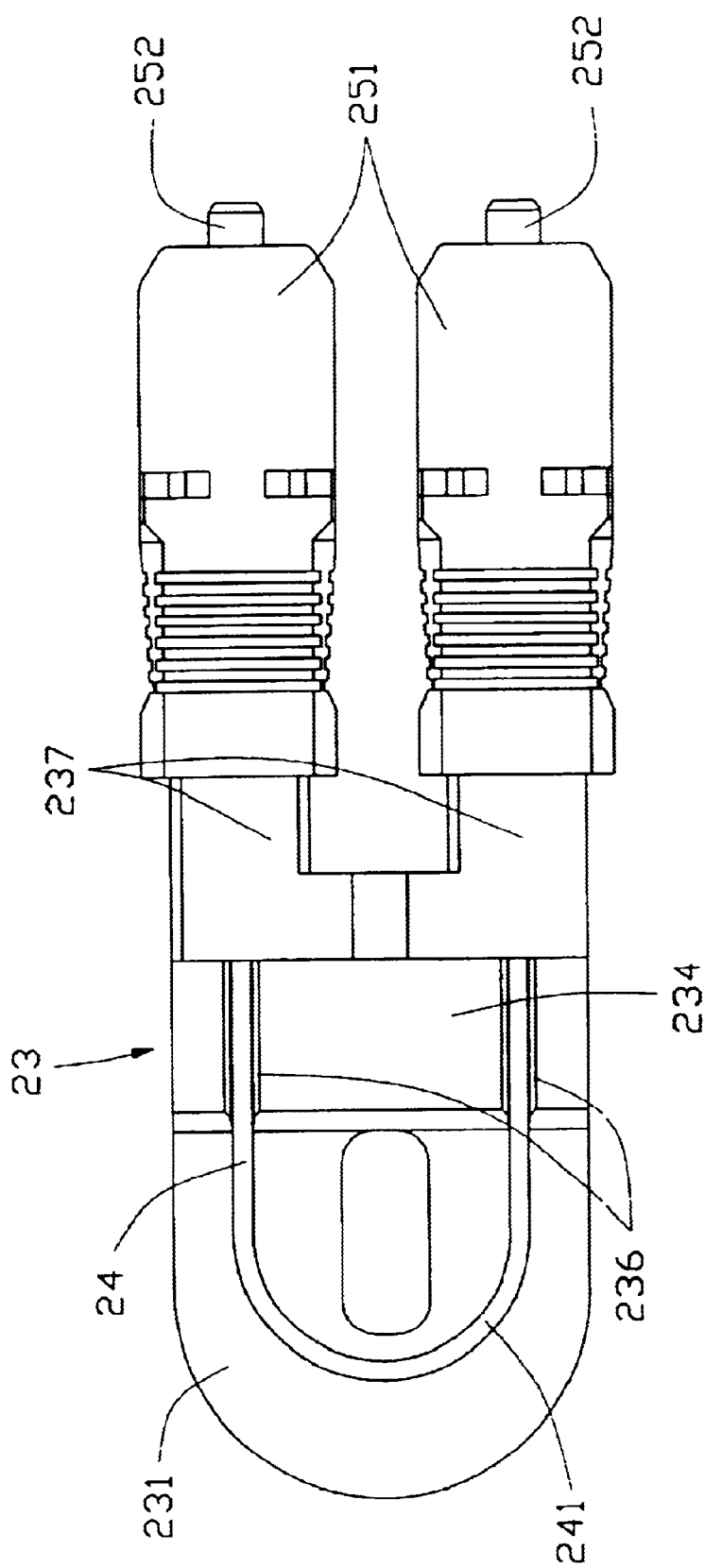
FIG. 5 is a bottom plan view of the attenuator of FIG. 4, but not showing a cover or a frame thereof.

Referring to FIG. 5, in assembly, the bent part 242 of the optical fiber 24 is placed on the supporting portion 231 of the optical fiber fixture 23. The bare portions 249 of the optical fiber 24 are retained in the ferrules 252 of the SC plug connectors 25. The retaining parts 243 of the optical fiber 24 are respectively retained in the corresponding grooves 236 of the retaining portion 24 and the corresponding through holes of the optical fiber holders 237 of the optical fiber fixture 23. The optical fiber holders 237 are partly received in openings (not shown) respectively defined in the rear portions of the corresponding SC plug connectors 25.

To obtain a desired attenuation, the opposite ends of the optical fiber 24 are optically connected with a light source (not shown) and an optical power meter (not shown) respectively. The bent part 242 of the optical fiber 24 is slightly adjusted until a desired attenuation of optical power is obtained according to readings on the optical power meter. Once the desired attenuation is obtained, the bent part 242 of the optical fiber 24 is secured to the supporting portion 231 of the optical fiber fixture 23 with adhesive.

The combined optical fiber fixture 23 and SC plug connectors 25 is placed in the frame 22. The positioning post 220 of the frame 22 extends through the positioning hole 232 of the optical fiber fixture 23. The SC plug connectors 25 are partly received in the frame 22. The rear portions of the SC plug connectors 25 are fittingly retained in the corresponding pairs of recesses 226 of the frame 22. The engaging rib 212 of the cover 21 is slidably engaged in the groove 227 of the frame 22.

While the present invention has been described with reference to particular embodiments, the description is illustrative of the invention and is not to be construed as limiting the invention. Therefore, various modifications to the present invention can be made to the preferred embodiments by those skilled in the art without departing from the true spirit and scope of the invention as defined by the appended claims.

What is claim is:

1. An optical attenuator comprising:
   an optical fiber comprising an attenuating part which is bent to obtain a desired attenuation;
   a fixture fixing the optical fiber thereto;
   two optical connectors respectively aligned with opposite ends of the optical fiber; and
   a housing having a cover and a frame to receive the fixture therein; wherein
   the fixture comprises a rear supporting portion, a central retaining portion, and two holders engaging with two corresponding optical connectors, respectively, wherein
   the optical connectors are partially engaged in the housing.

2. The optical attenuator as described in claim 1, wherein each of the optical connectors is a subscriber connector plug connector.

3. The optical attenuator as described in claim 1, wherein the attenuating part of the optical fiber is configured to be substantially semicircular.

4. The optical attenuator as described in claim 1, wherein the attenuating part of the optical fiber is configured to be substantially coiled.

5. The optical attenuator as described in claim 1, wherein each of the two holders has a through hole for passage of the optical fiber and the fixture defines two grooves in communication with the through holes of the two holders to retain corresponding parts of the optical fiber, respectively.

6. An optical attenuator comprising:
   an optical fiber comprising an attenuating part bent to obtain a desired attenuation;
   a fixture fixing the optical fiber thereto and comprising two front holders;
   two optical connectors respectively aligning with opposite ends of the optical fiber and engaging with the holders of the fixture respectively; and
   a housing including a cover and a frame;
   wherein the fixture is received in the housing; wherein the optical connectors are partially engaged in the housing.

7. The optical attenuator as described in claim 6, wherein each of the optical connectors is a subscriber connector plug connector.

8. The optical attenuator as described in claim 6, wherein the attenuating part of the optical fiber is configured to be substantially semicircular.

9. The optical attenuator as described in claim 6, wherein the attenuating part of the optical fiber is configured to be substantially coiled.

10. The optical attenuator as described in claim 6, wherein each of the holders has a through hole for passage of optical fiber, and the fixture defines two grooves in communication with the through holes of the two holders to retain corresponding parts of the optical fiber respectively.

11. A method of making an attenuator comprising the steps of:

providing a pair of juxtaposed fiber connectors with mating ports facing to a same direction;

connecting rear ends of said pair of connectors with an optical fiber;

securing the fiber in a fixture around two opposite end portions thereof;

forming a curved portion between said two end portions;

adjusting radii or turns of said curved portion for obtaining a desired attenuation value;

permanently fixing said curved portion to a supporting portion by adhesive in position without changing a configuration thereof; and packaging said fixture and said fiber connectors in a housing having a frame and a cover mating therewith.

* * * * *